Patented Jan. 20, 1948

UNITED STATES PATENT OFFICE 2,434,746

2,434,746

PROCESS OF PREPARING ORGANIC SULPHONIC DERIVATIVES

John Ross, Dwight James Potter, and Seymour Yolles, New York, N. Y., assignors to Colgate-Palmolive-Peet Company, Jersey City, N. J., a corporation of Delaware No Drawing. Application December 20, 1939, Serial No. 310,214

9 Claims. (Cl. 204—162)

The present invention is directed to a new process for manufacturing valuable organic products and more particularly it is directed to the novel production of organic materials having outstanding wetting, washing and emulsifying properties.

In the production of organic sulphonates from organic materials, numerous sulphonating agents have been employed. Until lately, however, it has been difficult to find an inexpensive, convenient, and readily controllable method for sulphonating a great variety of compounds, particularly those which have a saturated aliphatic structure such as heptadecane, cetyl alcohol, stearic acid, and the like. Strangely enough the majority of those agents described in the prior art for producing sulphonates by reaction with most types of organic material are often ineffectual for this purpose when reacted with the relatively inexpensive saturated aliphatic hydrocarbons, which materials occur naturally in large quantities in petroleum.

Recently, a method has been described in United States Patent 2,046,090 and the reissue thereof, United States Reissue Patent 20,968, for the preparation of halogen-substituted, sulphonated paraffin wax by the treatment of molten paraffin wax with a gaseous mixture of sulphur dioxide and chlorine to form a chlorine substituted paraffin hypochlor sulphurous chloride, and the molecular rearrangement of this product with oxidizing agents or boiling alkaline solutions to form the substituted paraffin sulphonate. Thus this process may be operated to form organic sulphonates but, because one of the reactants is chlorine gas under chlorinating conditions, the products will also have chlorine directly substituted on the carbon chain of the organic material. In addition, since the process involves a mixture of two gases, it is necessary to handle large volumes of these gases for the introduction of relatively small weights of effective reagents. Furthermore, these reactants are gaseous, hence the reaction is limited by the small solubility of the gases in the liquid hydrocarbon or other material being treated. The patentee indicated that this combination of gaseous agents, sulphur dioxide and chlorine, has different action from that of sulphuryl chloride on organic compounds. This is substantiated by the fact that in the Reissue Patent 20,968 it is implied that the process may be conducted in the presence of water. On the other hand, sulphuryl chloride would not be expected to remain coexistant with water for any long period at the operating temperatures described but would react to give hydrogen chloride and sulphuric acid derivatives.

It has been suggested to treat saturated aliphatic materials with sulphuryl chloride in various prior art procedures but no sulphonation of these compounds was ever observed with this agent, according to these disclosures. The United States Patent 1,765,601 to McKee describes a method of chlorinating short chain hydrocarbons by reaction with substantially dissociated sulphuryl chloride for a short time at a high temperature. Under these conditions, from methane or ethane, only chloralkanes were found to be produced.

By the process of this invention it is now possible to sulphonate saturated aliphatic compounds, particularly the saturated constituents of petroleum, with sulphuryl chloride. It has now been discovered that valuable detergents and other agents may be produced directly, not only from the more saturated cyclic and alicyclic aliphatic constituents which comprise the major proportion of many mineral oils, but also from other materials including long-chain alcohols, fatty acids, and the like. The present invention is directed to preparing very effective detergent materials of good foaming properties from certain petroleum fractions by a simple and direct procedure. This invention relates to the preparation of new organic materials of unusual and desirable properties by the treatment of aliphatic organic materials with a novel sulphonating agent.

The process generally is directed to the treatment in the presence of light, of organic materials, particularly those having at least eight carbon atoms, with a mixture of sulphuryl chloride and an inorganic catalytic agent, such as chlorine, sulphur dioxide, thionyl chloride, and carbon monoxide. The products of this reaction are organic sulphonyl chlorides which, when saponified, produce organic sulphonates having exceptional washing and wetting properties superior to those produced by many of the prior art procedures.

It has been found that this sulphonation reaction is dependent on four components or factors, all of which are essential to the present invention. To demonstrate this point, a gas oil hydrocarbon was treated with sulphuryl chloride in the prescribed temperature range with different agents and types of illumination. The following chart sets forth the conditions of treatment and the relative yield of sulphonates.

*Gas oil hydrocarbon and sulphuryl chloride*

| Activating Agent | Illumination | Approximate Per Cent Sulphonation |
|---|---|---|
| None | None | Nil |
| Do | 250 W. Mercury Lamp | Nil |
| Chlorine | None | Nil |
| Do | 40 W. Tungsten Lamp | 33 |
| Do | 250 W. Mercury Lamp | 64 |
| Sulphur dioxide | do | 41 |
| Carbon monoxide | do | 42 |
| Sulphur (0.1%) | do | 25 |
| Thionyl chloride | do | 65 |

From these results, it is apparent that it is essential for satisfactory sulphonation to also have light and an activating agent or catalyst along with the sulphuryl chloride and the material to be sulphonated.

The present invention preferably is directed to the treatment of acyclic aliphatic hydrocarbons such as a petroleum fraction with liquid sulphuryl chloride and with a catalytic inorganic non-metallic substance to yield an aliphatic sulphonyl halide which is then hydrolyzed to an aliphatic sulphonate.

Among the activating agents which may be used in conjunction with the sulphuryl chloride to effect sulphonation are chlorine, sulphur dioxide, carbon monoxide, sulphur, thionyl chloride, selenium, selenium dioxide, tellurium, tellurium dioxide, selenium sulphide, selenium oxychloride, sulphur chloride, carbon bisulphide, hydrogen sulphide, and carbonyl sulphide or mixtures of any of these inorganic catalysts or activating agents for sulphonation. It is possible to employ these added components in varying proportions.

In referring to the inorganic non-metallic activating agents for sulphonating with sulphuryl chloride, it is not only intended to designate these agents per se but also to include those materials which will form these agents under reaction conditions. For example, phosphorus pentachloride may be used as a source of chlorine, and formic acid, phosgene, or oxalic acid may be used as carbon monoxide generating materials. Bisulphites, thiosulphates, polythionates, thiocyanates, sulphides, and polysulphides may similarly be used as sources of sulphur or activating sulphur compounds. The following theory is submitted in order to better understand the invention, but it is not intended to limit the invention thereto. The operable activating agents appear to be labile substances which are, or can be dissociated into, atoms or complexes which have an unsaturated electron shell and are capable of proceeding to a higher state of oxidation to a material of varying order of stability. It has been reported in the literature that halogenation by means of sulphuryl chloride can be promoted by peroxides or other oxidizing materials by what is considered a chain reaction mechanism. We have now found that sulphonation with sulphuryl chloride can be achieved with the aid of reducing agents. It is to be understood that the term "reducing agent" is relative. In this case, the material which appears to initiate the sulphonation reaction chain is a reducing agent with respect to sulphuryl chloride under these conditions of illumination, activation and temperature.

The formation of sulphuryl chloride in situ for the sulphonation is also within the scope of this invention. This may be done by passing chlorine gas and sulphur dioxide gas in non-stoichiometrical proportions into the reaction mixture in the presence of a catalyst for the formation of sulphuryl chloride, such as adsorbent carbon, camphor and/or the like. These catalysts insure the production of sulphuryl chloride for the sulphonation reaction. By suitable selection of the adjuvant agent and/or catalyst, it is possible to prevent substantially any direct chlorination of the compound. For example, sulphuryl chloride with gaseous sulphur dioxide and/or carbon monoxide will effect sulphonation of saturated compounds without substantial chlorination.

According to the preferred process of this invention, an organic material, such as a straight chain aliphatic hydrocarbon having at least twelve carbon atoms, is sulphonated in the presence of light by adding liquid sulphuryl chloride and passing chlorine vapors thereinto in very finely dispersed state through the body of the mixture to be reacted. The treatment is continued at a temperature preferably between 0° and 100° C. until sulphonation and the desired degree of halogenation of the organic material is obtained. The sulphonyl chloride product may be purified by mixing it with liquid sulphur dioxide and hexane, and separating the liquid sulphur dioxide layer from the hexane layer. The liquid sulphur dioxide solution is then heated gently to remove the sulphur dioxide and other volatile materials. The sulphonyl halide product thus concentrated may then be hydrolyzed with water or aqueous solutions of salts and/or acids or alkalies, preferably with a caustic solution, to form aliphatic sulphonates. The sulphonyl halides and/or the aqueous solution of sulphonates may be bleached with chlorine gas. Excess gaseous reactants, by-products or other gaseous materials may be removed from the sulphonyl chlorides or the aqueous sulphonates by blowing with gases such as nitrogen, carbon dioxide, flue gases, sulphur dioxide, steam, and/or air. The aqueous solution of the sulphonate salt product may then be extracted with ether, gasoline or the like, to remove any remaining organic unsaponifiable material therefrom. Inorganic salts, such as sodium chloride, formed in the neutralization may be removed by extraction of the sulphonate with ethyl alcohol, butyl alcohol and the like, or the solution of the sulphonates may be dialyzed to obtain this result. Solvents and/or lower boiling materials may be added before the sulphonation and later separated from the desired products in subsequent steps of the process in order to facilitate the reaction and to lower the viscosity of the mass. The reaction may be carried substantially to completeness and in such cases it is not essential that the unsaponifiable material be removed, since the quantity thereof is relatively small.

Although the temperature of the treatment may be between broad limits, preferably between 0° and 200° C., it is advantageous to conduct the sulphonation between 40° and 100° C. The reaction may be facilitated by raising the reactants to this temperature range, and, depending on the rate of reaction and heat evolved, further heating may or may not be used, or even cooling of the reaction mixture may be employed. The temperature control may be effected by preheating or precooling the reactants, diluents and/or vapors; by vaporization of admixed liquids; and/or by external heating of the reaction mixture. It is advantageous to maintain the preferred temperature range since with certain raw materials the products tend to decompose, polymerize, discolor and develop an undesirable odor. In such cases the temperature control is very important in the production of materials of uniform properties.

The preferred products have a sulphonyl chloride group and may also contain one or more chlorine substituents but the latter is not essential. In hydrolyzing the reaction products containing chlorine and sulphonyl chloride groups, it is possible to hydrolyze the products so that the sulphonyl chloride is converted to a true sulphonate but substantially all the rest of the organic chlorine substituents remain on the product. This is best accomplished by hydrolyzing the product with dilute aqueous alkali at a temperature not substantially greater than 100° C. but higher temperatures can be used.

The reaction is affected by various factors which include the concentration of the reactants; the time of treatment; the temperature of reaction; the type of illumination or radiation as well as the intensity thereof; the pressure; the type and purity of organic material being treated; the nature of the catalyst or activating agent; and the presence or absence of other materials which promote or retard the reaction. The illumination from that portion of the spectrum beginning in the blue and extending into the ultra-violet is particularly effective in assisting the reaction.

The process for preparing the new products may be conducted by a continuous procedure whereby the organic material or a solution containing the organic material is mixed with sulphuryl chloride with or without solid or liquid activating agents and is continuously passed downwardly in a countercurrent flow to a rising adjuvant gas or gas mixture, such as sulphur dioxide, carbon monoxide and/or chlorine, through an illuminated column having bubble plates and/or packed with rings, beads, fibres or other shapes of corrosion resistant metal, activated carbon, clay, glass or other suitable inert material to increase the contact surface. The tower may also have catalytic materials therein. The sulphonated product may then be removed from the bottom of the tower and continuously bleached with a countercurrent stream of chlorine gas, continuously admixed with an aqueous alkali solution with vigorous agitation in order to hydrolyze the sulphonyl halide product, extracted continuously with a countercurrent flow of gasoline, ether or the like, continuously heated and flashed to remove retained solvent from the aqueous solution, continuously bleached with a countercurrent stream of chlorine gas, continuously neutralized, and continuously dried on heated rolls or by spraying into a heated atmosphere.

The preferred organic reactants for the preparation of valuable detergents by the present invention are the straight chain saturated aliphatic hydrocarbons. A particularly desirable source are those fractions from petroleum generally described as gas oil fractions. Although the preferred raw material is a Pennsylvania type paraffin base gas oil, it is also within the scope of this invention to similarly treat the individual constituents of such a gas oil particularly the aliphatic hydrocarbons having fourteen to twenty-two carbon atoms and especially the straight chain saturated hydrocarbons of this class such as n-heptadecane, n-docosane, n-tetradecane, n-octadecane and cetane.

The gas oil for this process advantageously is from a Pennsylvania (saturated paraffinic type) crude and has a boiling range between about 485° to 700° F. or any portion of this boiling range. However, either virgin or cracked gas oil of paraffinic, asphaltic, and/or naphthenic base from Pennsylvania, Mid-Continent, Gulf Coast, Colombia, Iran or California crudes or mixtures thereof may be used.

The gas oil or other petroleum fractions before sulphonation may be purified or concentrated by any of the known procedures. For example, the boiling range of the gas oil may be narrowed by fractional distillation, preferably under vacuum and in the presence of caustic soda. The gas oil may be treated with a small amount of concentrated sulphuric acid to remove resin-forming and other unstable constituents therefrom. It may also be admixed with filter clay, silica gel, or decolorizing carbon, which materials may be separated from the oil by settling, centrifuging and/or filtering. The more aromatic and unsaturated constituents of the gas oil may be separated by a solvent extraction thereof with materials of the type of liquid sulphur dioxide, propane and cresylic acid, phenol, furfural, liquid sulphur dioxide and benzene, dichloro-di-ethyl-ether, and the like. It is possible to sulphonate either of these fractions, but the better results have been obtained with the more saturated aliphatic materials. The other constituents of a gas oil including the olefinic and cyclo-aliphatic materials, however, may be similarly treated by the process of the present invention.

Among the materials which may be treated alone or along with one or more of the saturated aliphatic hydrocarbons or their mixtures such as gas oils are compounds having at least six carbon atoms; paraffin hydrocarbons such as dodecane, hexane, heptadecane, octadecane, and hexadecane; petroleum hydrocarbons such as paraffin wax, slack wax, white oil, kerosene, lubricating oils and raffinates of lubricating oil and kerosene extractions; cracked coal tar derivatives; hydrogenated coal; olefines, such as decene, hexene, cetene, dodecene, tetraisobutylene and other polymerized olefines; cyclic compounds including decalin, cyclohexane, methyl cyclohexane, dodecyl cyclohexane, and cyclohexene, sterols including cholesterol, phytosterol and the like; resins and fatty acids and their monohydric and full and partial polyhydric alcohol esters such as stearic acid, rosin, spermaceti, tallow, talloil, and monoglycerides of coconut oil; long chain alcohols and their derivatives; their halogen and other substituted derivatives, such as chlorinated paraffin wax, chlorinated gas oil, cetyl chloride and olefine halides; and various other aliphatic or cycloaliphatic materials and mixtures thereof. It is preferred to treat the less expensive and more available saturated aliphatic materials.

The products may be in the form of the acids or the salts of sodium, potassium, calcium, magnesium, aluminum, ammonia, mono-, di-, and tri-ethanolamine, amino-trimethylol-methane, amyl-amines, methyl-amines, aniline, pyridine and like metals or compounds. The bases corresponding to the above metals or compounds may be used for saponifying the sulphonyl halide products. The salts may be interchanged by the treatment of a solution of one salt of the novel compounds in a solvent such as acetone, ethyl alcohol, isopropyl alcohol, butyl alcohol, dioxane, monoglycerides, cellosolve and carbitol with a concentrated aqueous solution of a soluble salt of an inorganic acid having a different cation than that of the product to be treated. This process also serves to remove from the product the inorganic salts such as sodium chloride.

The following examples are given for the purpose of illustrating the invention but are not intended to be limiting on the scope thereof.

*Example I*

501 parts by weight of a Pennsylvania gas oil having a boiling range of about 490° to 600° F. are placed in a reaction vessel illuminated by an internally located 40 watt tungsten lamp. 400 parts by weight of chlorine are passed in at a uniform rate over a period of 6 hours. 361 parts by weight of sulphuryl chloride are added in four portions over a period of three hours. The total gain in weight of the gas oil mixture is about 270 parts. During this reaction the temperature remains between about 40° and 55° C. When a sample of the material is heated to 110° C. there is no appreciable loss in weight, indicating that there is no sulphuryl chloride remaining in the mixture. The reaction mixture is then treated at about 90° C. with 10% aqueous solution of caustic soda, more caustic being added from time to time until the mixture remains basic. The sulphonate salt solution is then treated with ether, which causes separation into three layers, of which the upper layer contains most of the unsaponifiable, the middle layer most of the sulphonate, while the lower layer contains largely excess alkali, most of the inorganic salts and some of the sulphonate. The lower and middle layers are washed carefully with ether to remove substantially all the unsaponifiable material therefrom. The sulphonate solution obtained shows good foaming, wetting and washing properties. The yield of sulphonate salt product is about 33% based on the gas oil.

*Example II*

431 parts by weight of a Pennsylvania gas oil are treated with 420 parts by weight of chlorine and 405 parts by weight of sulphuryl chloride in the manner described in the previous examples, but with the illumination supplied by a 250 watt high intensity mercury lamp. During this treatment the temperature may vary between about 40° to 60° C. The total weight gain of the gas oil mixture is about 350 parts. The sulphuryl chloride product is heated to about 110° C. to remove any small amounts of residual sulphuryl chloride. The reaction mixture is hydrolyzed by stirring with caustic soda solution on the steam bath at about 90° C. The unsaponifiable is recovered by ether extraction. The yield of sulphonates (45%) obtained by this light is substantially greater than obtained with the illumination in Example I.

*Example III*

490 parts by weight of Pennsylvania gas oil are treated with 810 parts by weight of sulphuryl chloride and 120 parts by weight of chlorine at temperature varying between 30° and 45° C. under illumination of a 250 watt mercury lamp. Treatment with chlorine and sulphuryl chloride is continued for five hours. A portion of the reaction product is hydrolyzed in the manner described in the above examples. The aqueous solution is washed with ether to separate unsaponifiable material from the sulphonate salt detergent product.

*Example IV*

402 parts by weight of the reaction mixture obtained in Example III are treated with 125 additional parts by weight of chlorine under the mercury lamp illumination. At the end of the treatment the weight is about 384 parts. The resulting product is hydrolyzed and ether extracted as described in the foregoing examples. The yield of sulphonate product is increased by the additional chlorine-light treatment.

*Example V*

177 parts by weight of heptadecane are treated over a period of four hours with 165 parts by weight of chlorine and 199 parts by weight of sulphuryl chloride. The gain in weight is about 159.5 parts by weight. The temperature is maintained between 30° and 50° C. and the illumination is supplied by a 250 watt mercury arc lamp. No loss in weight is detected when the product is heated to about 110° C., indicating that all the sulphuryl chloride has been used. The sulphuryl chloride product is hydrolyzed with 10% sodium hydroxide solution on the steam bath. Ether extraction of the aqueous solution removes the non-hydrolyzable material, yielding about 64% of an aliphatic sulphonate product.

*Example VI*

208 parts by weight of a Pennsylvania gas oil having a boiling range between about 490° and 600° F. are treated with sulphur dioxide and sulphuryl chloride in a transparent vessel illuminated with a 250 watt mercury arc lamp. The gain in weight is 87.5 parts by weight after 320 parts by weight of sulphuryl chloride and 475 parts by weight of sulphur dioxide have been added over a period of four and three-quarter hours. The temperature is maintained between 40° and 60° C. during the treatment. The product contains substantially no sulphuryl chloride at the end of the reaction. The organic sulphonyl chloride product is hydrolyzed with 10% sodium hydroxide on the steam bath and ether extracted to remove non-sulphonated material. About 41.5% of the gas oil is converted to a sulphonate salt product of desirable physical and chemical properties.

*Example VII*

192.5 parts by weight of heptadecane are treated at 30–40° C. with 348 parts by weight of sulphuryl chloride and 645 parts by weight of sulphur dioxide added over a period of six hours. The gain in weight is 170.5 parts. Illumination is supplied by a 250 watt mercury arc lamp during the treatment. The product is hydrolyzed with 10% sodium hydroxide on the steam bath. The aqueous solution is ether extracted to remove the non-hydrolyzable material. A conversion to sulphonate of 28% of the heptadecane is obtained.

*Example VIII*

83.5 parts by weight of a Pennsylvania gas oil having a boiling range between about 255° and 320° C. are treated at about 40°–50° C. with about 200 parts by weight of carbon monoxide and about 229 parts by weight of sulphuryl chloride over a period of about six hours. The gain in weight is about 56 parts by weight. Illumination is supplied by a 250 watt mercury arc lamp. The product is hydrolyzed with 10% sodium hydroxile on the steam bath and ether extracted to remove non-saponifiable material. A yield of about 42% of an organic sulphonate salt is obtained.

*Example IX*

72.5 parts by weight of heptadecane are treated at about 40°–45° C. with carbon monoxide and sulphuryl chloride while illuminated with a 250 watt mercury arc lamp. After 264 parts by weight of sulphuryl chloride and 200 parts by weight of carbon monoxide have been added, over a period of six hours, the gain in weight is about 44 parts. The product is hydrolyzed with 10% sodium hydroxide on the steam bath. Ether extraction of the aqueous solution removes the non-saponifiable material. The conversion of heptadecane to a sulphonate is about 19%.

*Example X*

Fifty-nine (59) parts by weight of heptadecane, 108 parts by weight of sulphuryl chloride and 69 parts by weight of thionyl chloride are mixed together in a round bottom flask fitted with a thermometer and a reflux condenser, and the mixture is irradiated for about 18 hours by a 250 watt mercury lamp placed about 3 inches from the flask. The temperature of the mixture during the treatment is about 50°–60° C. There is a slow evolution of gas during the treatment. Unreacted sulphuryl chloride and thionyl chloride are distilled off by heating the mixture to about 115° C. The gain in weight of the mixture after removal of volatile material is about 66 parts by weight. The product is hydrolyzed by treating on a steam bath with 10% caustic soda solution. The cooled aqueous solution is ether extracted to remove unsaponifiable material. A yield of about 65% of a heptadecane sulphonate salt is obtained.

*Example XI*

49.5 parts by weight of heptadecane, 83 parts by weight of sulphuryl chloride, and 0.1 part by weight of sulphur were placed in a flask equipped with a reflux condenser and illuminated by a 250 watt mercury lamp. The material is maintained at a temperature of about 50° to 60° C. for about twelve hours. At the end of the reaction, the mixture is poured into caustic soda and heated to hydrolyze the product. The unsulphonatable material is separated by treating the aqueous solution with ether. About 25% of a heptadecane sulphonate salt is the yield.

The sulphonate products obtained according to the present invention, either as acids or salts, have good wetting, solubilizing, deterging, sudsing, water-softening, dispersing, emulsifying, penetrating, and equalizing properties. They operate efficiently in hard as well as in soft water, whether hot or cold, and in the presence or absence of large quantities of inorganic salts such as sodium chloride and sodium sulphate. They may also be used in admixture with other wetting and emulsifying agents including alkali metal, ammonium and amine soaps of fatty acids, resins, long-chain alcohol sulphates, monoglyceride monosulphates, sulphonated mineral oil extracts and turkey red oil, lecithin, glycerolamines, monoethanolamine, diethanolamine and triethanolamine and their soaps; alkaline soap builders, water softeners, and other salts such as borax, sodium carbonate, silicates, phosphates, tetraphosphate, pyrophosphate, hexametaphosphate, sulphate, chloride, acetate, citrate, tartrate, perborate, bicarbonate, sesquicarbonate, hypochlorite, thiosulphate, and hydrosulphite, and their other alkali metal, ammonia, and amine salts or alkyl esters; acids including boric acid, citric acid and tartaric acid; coloring matter such as dyes, lakes, pigments; abrasives and fillers such as silica, pumice, feldspar, precipitated chalk, infusorial earth, bentonite, talc, starch, and air; liquids including carbon tetrachloride, perchlorethylene, trichlorethylene, glycerine, ethyl alcohol, tetrahydrofurfuryl alcohol, phenol, cyclohexanol, water, tetralin, hexalin, pine oil, mineral oil, mineral oil extracts, and naphtha; perfumes and deodorants; fats, oils, fatty acids, monoglycerides, vitamins, waxes, gums, glue, resins; germicides such as phenol mercury chloride, phenyl mercury nitrate, phenyl mercury chloride; and/or styptics such as aluminum chloride, adrenalin and cephalin. The type of addition agent to be used, of course, will depend on the ultimate use of the new compositions.

The final composition, with or without one or more addition agent, may be formed into beads, flakes, bars, chips, crystals, powders solutions, liquid or plastic emulsions, pastes, creams, salves, or any other forms desired. The ingredients may be mixed by any of the common methods such as grinding, stirring, kneading, crutching, fusing, and drying by heated rolls, spray or otherwise of mixed solutions or dispersions.

The various products and compositions of this invention may be used for various purposes such as laundry detergents and other textile agents including laundry blueing, bleaching, dyeing, mercerizing, softening, lubricating, and discharging compositions; drain, lavatory and radiator cleaners; paint, stain and grease removers; drycleaning compositions; rug cleaners; water softeners; washing compositions for fruit, fabric, wood, metal, stone, glass, brick, masonry, and alkali sensitive and/or painted surfaces; liquid, solid and paste tooth and mouth detergents; shampoos; cosmetics, depilatories; deodorants; antiseptics; insecticides; dust preventing compositions; fire extinguishing compositions; antifreezing, anti-fogging, and anti-corrosion compositions; wood impregnants; electrolytic baths; metal pickling; etching compositions; tanning agents and fat-liquors for leather; photographic solutions; petroleum de-emulsifying compositions; lubricating oil and fuel compositions; ore flotation; fat splitting; cements and plastic compositions; abrasive compositions; water paints and polishes; sizes, glues, and adhesives such as shellac and casein compositions; preparation of dyes and dye intermediates; preparation of germicidal agents; preparation of resins and plasticizers such as sulphonamids and substituted sulphonamids and the sulphonamid-aldehyde condensation products; and any compositions requiring wetting, washing, emulsifying, penetrating, solubilizing, dispersing and like agents.

As many apparently widely differing embodiments of this invention may be made without departing from the spirit and scope thereof, it is to be understood that the application is not limited to the specific proportions or embodiments thereof except as defined in the following claims.

We claim:

1. The process of preparing organic sulphonic derivatives which comprises causing a saturated aliphatic organic compound having at least six carbon atoms to react with sulphuryl chloride by admixing sulphuryl chloride with said organic compound in the presence of an inorganic agent which is capable of activating the formation of sulphonic derivatives of the saturated aliphatic organic compound, said agent being selected from the group consisting of chlorine, sulphur dioxide, carbon monoxide, sulphur, thionyl chloride, selenium, selenium dioxide, tellurium, tellurium dioxide, selenium sulphide, selenium oxychloride, carbon bisulphide, hydrogen sulphide and carbonyl sulphide, and subjecting the reaction mixture to actinic light and to a temperature within the range of about 0° to 200° C.; and maintaining reaction conditions at least until a sulphonic derivative of the saturated aliphatic organic compound has been formed.

2. The process for the preparation of organic sulphonic derivatives which comprises causing a saturated aliphatic hydrocarbon to react with sulphuryl chloride by admixing sulphuryl chloride with said hydrocarbon in the presence of an inorganic agent which is capable of activating the formation of sulphonic derivatives of the saturated aliphatic hydrocarbon, said agent being selected from the group consisting of chlorine, sulphur dioxide, carbon monoxide, sulphur, thionyl chloride, selenium, selenium dioxide, tellurium, tellurium dioxide, selenium sulphide, selenium oxychloride, carbon bisulphide, hydrogen sulphide and carbonyl sulphide, and subjecting the reaction mixture to actinic light and to a temperature within the range of about 0° C. to 200° C.; and maintaining reaction conditions at least until a sulphonic derivative of the saturated aliphatic hydrocarbon has been formed.

3. The process for the preparation of organic sulphonic derivatives which comprises causing a saturated aliphatic hydrocarbon having six to twenty-two carbon atoms to react with sulphuryl chloride by admixing sulphuryl chloride with said hydrocarbon in the presence of an inorganic agent which is capable of activating the formation of sulphonic derivatives of the saturated aliphatic hydrocarbon, said agent being selected from the group consisting of chlorine, sulphur dioxide, carbon monoxide, sulphur, thionyl chloride, selenium, selenium dioxide, tellurium, tellurium dioxide, selenium sulphide, selenium oxychloride, carbon bisulphide, hydrogen sulphide and carbonyl sulphide, and subjecting the reaction mixture to actinic light and to a temperature within the range of about 0° C. to 200° C.; and maintaining reaction conditions at least until a sulphonic derivative of the saturated aliphatic hydrocarbon has been formed.

4. The process of preparing organic sulphonic derivatives which comprises causing a saturated aliphatic hydrocarbon having at least six carbon atoms to react with sulphuryl chloride by admixing sulphuryl chloride with said hydrocarbon in the presence of chlorine, and subjecting the reaction mixture to actinic light and to a temperature within the range of about 0° C. to 100° C.; and maintaining reaction conditions at least until a sulphonic derivative of the saturated aliphatic hydrocarbon has been formed.

5. The process of preparing organic sulphonic derivatives which comprises causing a saturated aliphatic hydrocarbon having at least six carbon atoms to react with sulphuryl chloride by admixing sulphuryl chloride with said hydrocarbon in the presence of sulphur dioxide and subjecting the reaction mixture to actinic light and to a temperature within the range of about 0° C. to 100° C.; and maintaining reaction conditions at least until a sulphonic derivative of the saturated aliphatic hydrocarbon has been formed.

6. The process of preparing organic sulphonic derivatives which comprises causing a saturated aliphatic hydrocarbon having at least six carbon atoms to react with sulphuryl chloride by admixing sulphuryl chloride with said hydrocarbon in the presence of thionyl chloride and subjecting the reaction mixture to actinic light and to a temperature within the range of about 0° C. to 100° C.; and maintaining reaction conditions at least until a sulphonic derivative of the saturated aliphatic hydrocarbon has been formed.

7. The process of preparing organic sulphonic derivatives which comprises causing a saturated aliphatic organic compound having at least six carbon atoms to react with sulphuryl chloride by contacting substantial amounts of sulphuryl chloride with said organic compound in the presence of an inorganic agent which is capable of activating the formation of sulphonic derivatives of the saturated aliphatic organic compound, said agent being selected from the group consisting of chlorine, sulphur dioxide, carbon monoxide, sulphur, thionyl chloride, selenium, selenium dioxide, tellurium, tellurium dioxide, selenium sulphide, selenium oxychloride, carbon bisulphide, hydrogen sulphide and carbonyl sulphide, and subjecting the reaction mixture to actinic light and to a temperature within the range of about 0° to 200° C.; and maintaining reaction conditions at least until a sulphonic derivative of the saturated aliphatic organic compound has been formed.

8. A process of producing a sulfonyl chloride which comprises reacting a hydrocarbon selected from the group consisting of saturated aliphatic and alicyclic hydrocarbons that contain at least 6 carbon atoms with sulfuryl chloride in the presence of actinic light and a catalyst selected from the group consisting of chlorine, sulphur dioxide, carbon monoxide, sulphur, thionyl chloride, selenium, selenium dioxide, tellurium, tellurium dioxide, selenium sulphide, selenium oxychloride, carbon bisulphide, hydrogen sulphide and carbonyl sulphide, and then further reacting the sulfonyl chloride thereby formed.

9. A process of preparing an organic sulfonate which comprises forming a sulfonyl chloride by reacting a saturated aliphatic hydrocarbon that contains at least 6 carbon atoms with sulfuryl chloride in the presence of actinic light and a catalyst selected from the group consisting of chlorine, sulphur dioxide, carbon monoxide, sulphur, thionyl chloride, selenium, selenium dioxide, tellurium, tellurium dioxide, selenium sulphide, selenium oxychloride, carbon bisulphide, hydrogen sulphide and carbonyl sulphide and then hydrolyzing the sulfonyl chloride thus obtained.

JOHN ROSS.
DWIGHT JAMES POTTER.
SEYMOUR YOLLES.

REFERENCES CITED

The following references are of record in the file of this patent:

UNITED STATES PATENTS

| Number | Name | Date |
| --- | --- | --- |
| 1,966,187 | Schirm | July 10, 1934 |
| 2,061,617 | Downing et al. | Nov. 24, 1936 |
| 2,171,117 | Schrauth et al. | Aug. 29, 1939 |
| 2,193,824 | Lockwood et al. | Mar. 19, 1940 |
| 2,023,387 | Harris | Dec. 3, 1935 |
| 2,383,319 | Kharasch | Aug. 21, 1945 |

FOREIGN PATENTS

| Number | Country | Date |
| --- | --- | --- |
| 259,329 | Great Britain | Oct. 14, 1926 |

OTHER REFERENCES

Silberrad, Journal of the Chemical Society, vol. 119, pages 2029–36.

Nenitzescu, Deutsche chemische gesellschaft. Berichte, vol. 67B, pages 1391–3.

Mellor, "Treatise on Inorganic and Theoretical Chemistry," vol. X, pages 666–670.

Journal of the American Chemical Society, vol. 61, Nov. 1939, pages 3089–3092.

Chemical Abstracts, vol. 14, page 493, (1920).